(12) United States Patent
Tokutomi et al.

(10) Patent No.: US 11,440,274 B2
(45) Date of Patent: Sep. 13, 2022

(54) DEVICE FOR MANUFACTURING FIBER-REINFORCED PLASTIC MOLDED ARTICLE

(71) Applicant: MITSUBISHI HEAVY INDUSTRIES, LTD., Tokyo (JP)

(72) Inventors: Hiroshi Tokutomi, Tokyo (JP); Kodai Shimono, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 606 days.

(21) Appl. No.: 15/574,049

(22) PCT Filed: Aug. 16, 2016

(86) PCT No.: PCT/JP2016/073926
§ 371 (c)(1),
(2) Date: Nov. 14, 2017

(87) PCT Pub. No.: WO2017/043266
PCT Pub. Date: Mar. 16, 2017

(65) Prior Publication Data
US 2018/0297300 A1    Oct. 18, 2018

(30) Foreign Application Priority Data

Sep. 11, 2015 (JP) .............................. JP2015-179642

(51) Int. Cl.
*B29C 70/54* (2006.01)
*B29D 99/00* (2010.01)
(Continued)

(52) U.S. Cl.
CPC .......... *B29C 70/541* (2013.01); *B29C 33/303* (2013.01); *B29C 70/42* (2013.01);
(Continued)

(58) Field of Classification Search
CPC ..... B29C 70/541; B29C 70/44; B29C 70/544; B29C 70/543; B29C 70/549
See application file for complete search history.

(56) References Cited

U.S. PATENT DOCUMENTS 4,822,436 A * 4/1989 Callis ................. B29C 43/3642
156/211
5,439,635 A * 8/1995 Seemann ............ B29C 33/0066
264/154
(Continued)

FOREIGN PATENT DOCUMENTS

EP          1415782 A1    5/2004
GB          2316036 A     2/1998
(Continued)

OTHER PUBLICATIONS

PCT, "International Search Report for International Application No. PCT/JP2016/073926" dated Sep. 13, 2016.
(Continued)

*Primary Examiner* — Matthew J Daniels
(74) *Attorney, Agent, or Firm* — Manabu Kanesaka; Benjamin J. Hauptman; Kenneth M. Berner

(57) ABSTRACT

An object is to provide a device and method for manufacturing a fiber-reinforced plastic molded article, whereby two members can be accurately positioned with respect to each other upon integral molding of the members via a VaRTM method. A device for manufacturing a fiber-reinforced plastic molded article includes a skin mold in which a skin, which is a cured fiber-reinforced composite member, is mounted; a stringer mold that is configured to accommodate a stringer, which is a fabric to be joined to the skin; and a folded plate that is configured to accommodate the stringer mold and includes a positioning portion for positioning with respect to a positioning portion provided on the skin.

9 Claims, 7 Drawing Sheets

(51) Int. Cl.
    *B29C 70/42*     (2006.01)
    *B29C 33/30*     (2006.01)
    *B29C 70/44*     (2006.01)
    *B29C 70/48*     (2006.01)
    *B29L 31/30*     (2006.01)

(52) U.S. Cl.
    CPC ............ *B29C 70/443* (2013.01); *B29C 70/48* (2013.01); *B29D 99/0014* (2013.01); *B29K 2905/02* (2013.01); *B29L 2031/3082* (2013.01)

(56) References Cited

U.S. PATENT DOCUMENTS

| | | | |
|---|---|---|---|
| 7,081,218 B2 | 7/2006 | Sekido et al. | |
| 8,795,578 B2 | 8/2014 | Millar et al. | |
| 2010/0193114 A1* | 8/2010 | Millar | B29C 70/543 |
| | | | 156/441.5 |
| 2010/0314042 A1* | 12/2010 | Luebbering | B29C 33/46 |
| | | | 156/286 |
| 2011/0309547 A1 | 12/2011 | D'Acunto et al. | |
| 2012/0080142 A1* | 4/2012 | Kulik | B29C 70/342 |
| | | | 156/213 |
| 2014/0050813 A1* | 2/2014 | Balas | B29C 43/18 |
| | | | 425/388 |
| 2014/0360657 A1* | 12/2014 | Murai | B29C 70/543 |
| | | | 156/245 |
| 2015/0367559 A1 | 12/2015 | Hattori et al. | |

FOREIGN PATENT DOCUMENTS

| | | |
|---|---|---|
| JP | H03-268911 A | 11/1991 |
| JP | H04-334434 A | 11/1992 |
| JP | 2005-246771 A | 9/2005 |
| JP | 2009-179065 A | 8/2009 |
| JP | 2010-131991 A | 6/2010 |
| JP | 2014-136418 A | 7/2014 |
| JP | 2014-237243 A | 12/2014 |
| RU | 2008148344 A | 6/2010 |
| RU | 2524108 C2 | 7/2014 |
| WO | 2008/007043 A1 | 1/2008 |
| WO | 2009/010706 A1 | 1/2009 |

OTHER PUBLICATIONS

Europe Patent Office, Search Report for European Patent Application No. 16844129.3, dated Jun. 21, 2018.
Europe Patent Office, "Office Action for European Patent Application No. 16844129.3," dated May 10, 2019.
Russia Patent Office, "Office Action for Russian Patent Application No. 2017139794," dated Feb. 6, 2019.

\* cited by examiner

DEVICE FOR MANUFACTURING FIBER-REINFORCED PLASTIC MOLDED ARTICLE

RELATED APPLICATIONS

The present application is National Phase of International Application No. PCT/JP2016/073926 filed Aug. 16, 2016, and claims priority from Japanese Application No. 2015-179642, filed Sep. 11, 2015, the disclosure of which is hereby incorporated by reference herein in its entirety.

TECHNICAL FIELD

The present invention relates to a device and method for manufacturing a fiber-reinforced plastic molded article.

BACKGROUND ART

Methods of forming aircraft structural members from fiber-reinforced plastic (FRP) are known. Such FRP structural members are integrally joined via mechanical joining using rivets or joining using an adhesive. Patent Literature 1 listed below describes the technology in which two members to be joined together are prepared, one as a precured fiber-reinforced composite member and the other as a reinforced fabric. The two members are placed in a sealed medium, the inside of which reduced in pressure and heated. Then, resin is injected inside the sealed medium to cure the members. The technology described in Patent Literature 1 is an example of a method for integral molding employing vacuum assisted resin transfer molding (VaRTM) in which the difference in pressure between a vacuum and the atmosphere is used to facilitate impregnation of resin in a fabric. Aside from VaRTM, other integral molding methods using prepreg molding to integrally mold two members are also known.

CITATION LIST

Patent Literature

Patent Literature 1: JP-A-2005-246771

SUMMARY OF INVENTION

Technical Problems

In integral molding of a plurality of members, the positioning of the members relative to each other must be accurate. In methods of integral molding via VaRTM, a cured cFRP member is fixed in a lower mold jig, and a fabric (preform) is mounted on the cFRP member and positioned in reference to the lower mold jig. Specifically, by the fabric being accommodated by an upper mold jig and the upper mold jig being positioned relative to the lower mold jig, the fabric is indirectly positioned.

When the lower mold jig is made from generic materials such as steel or aluminum, the costs are low and cutting is simple. However, in the heating process of VaRTM, the lower mold jig experiences thermal expansion. As a result, the reinforced fabric cannot be accurately mounted in position on the cFRP. This problem also occurs in co-bonding methods other than VaRTM such as integral molding including prepreg molding, for example.

In light of these issues, an object of the present invention is to provide a device and method for manufacturing a fiber-reinforced plastic molded article, whereby two members can be accurately positioned with respect to each other upon integral molding of the members via a VaRTM method.

Solution to Problems

A device for manufacturing a fiber-reinforced plastic molded article according to a first aspect of the present invention comprises: a first mold in which a cured fiber-reinforced composite member is mounted; a second mold that accommodates a fabric to be joined to the fiber-reinforced composite member; and a fixing member that is configured to accommodate the second mold and comprises a first positioning portion for positioning with respect to a positioning part provided on the fiber-reinforced composite member.

According to this configuration, by the fixing member being positioned relative to the fiber-reinforced composite member, the second mold accommodated in the fixing member and the fabric accommodated in the second mold are positioned relative to the fiber-reinforced composite member. In other words, the positioning of the fabric relative to the fiber-reinforced composite member is not determined against the first mold, but against the fiber-reinforced composite member. This allows the fabric to be accurately positioned, avoiding the effects of the thermal expansion of the first mold.

A device for manufacturing a fiber-reinforced plastic molded article according to a second aspect comprises: a second mold that accommodates a fabric to be joined to a cured fiber-reinforced composite member; and a fixing member that is configured to accommodate the second mold and comprises a first positioning portion for positioning with respect to a positioning part provided on the fiber-reinforced composite member.

According to this configuration, by the fixing member being positioned relative to the fiber-reinforced composite member, the second mold accommodated in the fixing member and the fabric accommodated in the second mold are positioned relative to the fiber-reinforced composite member. In other words, the positioning of the fabric relative to the fiber-reinforced composite member is not determined against the first mold, but against the fiber-reinforced composite member. This allows the fabric to be accurately positioned, avoiding the effects of the thermal expansion of the first mold.

The first and second aspects preferably have a configuration in which the fiber-reinforced composite member comprises a second positioning portion as the positioning part, the second positioning portion corresponding to the first positioning portion.

According to this configuration, the positioning of the fabric relative to the fiber-reinforced composite member is achieved by the corresponding second positioning portion provided on the fiber-reinforced composite member and the first positioning portion provided on the fixing member.

A device for manufacturing a fiber-reinforced plastic molded article according to the third aspect of the present invention comprises: a first mold in which a cured fiber-reinforced composite member is mounted; and a bladder made of flexible resin that accommodates a fabric to be joined to the fiber-reinforced composite member and comprises a third positioning portion for positioning with respect to a positioning part provided on the fiber-reinforced composite member.

According to this configuration, by the bladder being positioned relative to the fiber-reinforced composite member, the fabric accommodated in the bladder is positioned relative to the fiber-reinforced composite member. In other words, the positioning of the fabric relative to the fiber-reinforced composite member is not determined against the first mold, but against the fiber-reinforced composite member. This allows the fabric to be accurately positioned, avoiding the effects of the thermal expansion of the first mold. The bladder is made of flexible resin such as a silicon resin, for example.

The third aspect preferably has a configuration in which the fiber-reinforced composite member comprises a second positioning portion as the positioning part, the second positioning portion corresponding to the third positioning portion.

According to this configuration, the positioning of the fabric relative to the fiber-reinforced composite member is achieved by the corresponding second positioning portion provided on the fiber-reinforced composite member and the third positioning portion provided on the bladder.

A device for manufacturing a fiber-reinforced plastic molded article according to the fourth aspect of the present invention comprises: a first mold in which a cured fiber-reinforced composite member is to be mounted; and a second mold that accommodates a fabric to be joined to the fiber-reinforced composite member and comprises a fourth positioning portion for positioning with respect to a positioning part provided on the fiber-reinforced composite member.

According to this configuration, by the second mold being positioned relative to the fiber-reinforced composite member, the fabric accommodated in the second mold is positioned relative to the fiber-reinforced composite member. In other words, the positioning of the fabric relative to the fiber-reinforced composite member is not determined against the first mold, but against the fiber-reinforced composite member. This allows the fabric to be accurately positioned, avoiding the effects of the thermal expansion of the first mold.

The fourth aspect preferably has a configuration in which the fiber-reinforced composite member comprises a second positioning portion as the positioning part, the second positioning portion corresponding to the fourth positioning portion.

According to this configuration, the positioning of the fabric relative to the fiber-reinforced composite member is achieved by the corresponding second positioning portion provided on the fiber-reinforced composite member and the fourth positioning portion provided on the second mold.

A method for manufacturing a fiber-reinforced plastic molded article according to the fifth aspect of the present invention comprises the steps of: mounting a cured fiber-reinforced composite member in a first mold; accommodating a fabric to be joined to the fiber-reinforced composite member in a second mold; accommodating the second mold in a fixing member; mounting the fixing member on the fiber-reinforced composite member by positioning a first positioning portion provided on the fixing member with respect to a positioning part provided on the fiber-reinforced composite member; and injecting the fiber-reinforced composite member and the fabric accommodated in the first mold and the second mold with resin.

A method for manufacturing a fiber-reinforced plastic molded article according to the sixth aspect of the present invention comprises the steps of: accommodating a fabric to be joined to a cured fiber-reinforced composite member in a second mold; accommodating the second mold in a fixing member; mounting the fiber-reinforced composite member in the second mold by positioning a positioning part provided on the fiber-reinforced composite member with respect to a first positioning portion provided on the fixing member; and injecting the fiber-reinforced composite member and the fabric accommodated in the second mold with resin.

A method for manufacturing a fiber-reinforced plastic molded article according to the seventh aspect of the present invention comprises the steps of: mounting a cured fiber-reinforced composite member in a first mold; accommodating a fabric to be joined to the fiber-reinforced composite member with flexible resin bladder; mounting the bladder on the fiber-reinforced composite member by positioning a third positioning portion provided on the bladder with respect to a positioning part provided on the fiber-reinforced composite member; and injecting the fiber-reinforced composite member and the fabric accommodated in the first mold and the bladder with resin.

A method for manufacturing a fiber-reinforced plastic molded article according to the eighth aspect of the present invention comprises the steps of: mounting a cured fiber-reinforced composite member in a first mold; accommodating a fabric to be joined to the fiber-reinforced composite member in a second mold; mounting the second mold on the fiber-reinforced composite member by positioning a fourth positioning portion provided on the second mold with respect to a positioning part provided on the fiber-reinforced composite member; and injecting the fiber-reinforced composite member and the fabric accommodated in the second mold with resin.

Advantageous Effects of Invention

According to the present invention, in integral molding of a plurality of members via a VaRTM method, the positioning of the members relative to each other can be made accurate.

DESCRIPTION OF EMBODIMENTS

Figure 1:
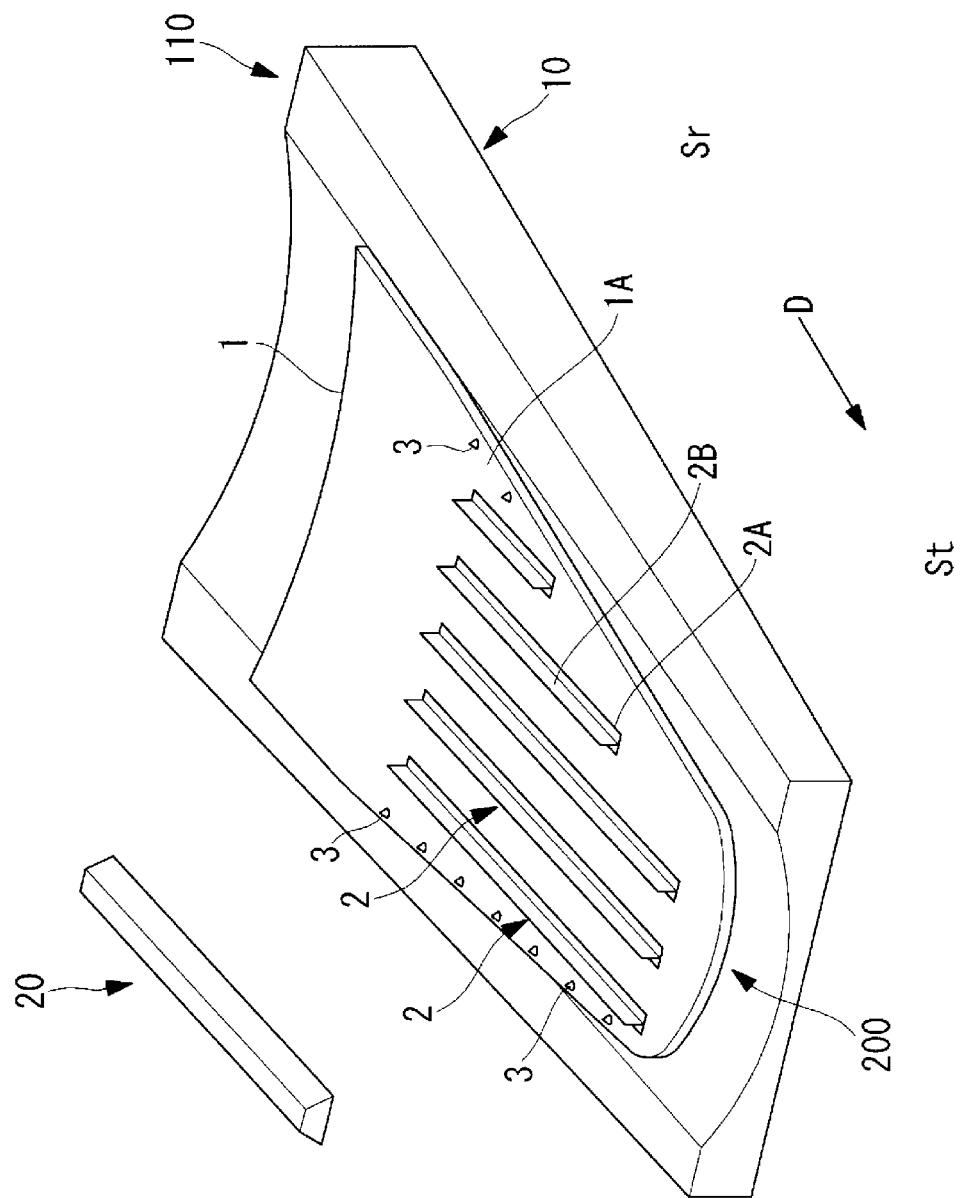
FIG. 1 is a perspective view of a device for manufacturing a fiber-reinforced plastic article according to the first embodiment of the present invention.

Embodiments of the present invention are described below with reference to the drawings.

First Embodiment

A device for manufacturing a fiber-reinforced plastic molded article and a method for manufacturing the same according to the first embodiment of the present invention will be described with reference to FIG. 1.

In the present embodiment, a fiber-reinforced plastic molded article 200 with an integrally formed skin 1 and stringer 2 is manufactured using a device 110 for manufacturing provided with a folded plate 30 for positioning the stringer 2 relative to the skin 1.

First, the configuration according to an example of the fiber-reinforced plastic molded article 200 will be described with reference to FIG. 1. Herein, an example using a FRP structural body that composes an aircraft is described. However, the present invention can be widely applied to manufacturing of a FRP molded article composing other various devices/structures.

The fiber-reinforced plastic molded article 200 includes the skin 1 and the stringer 2 disposed on a back surface 1A of the skin 1.

The skin 1 forms the surface skin of a wing of an aircraft and is assembled together with a spar (not illustrated) into a box shape. The skin is formed with a curved surface. The skin 1 gradually decreases in width from the base side Sr of the wing toward the tip side St. Note that the shape of the skin 1 is not limited to this example and may have a constant width in the length direction.

Figure 2:
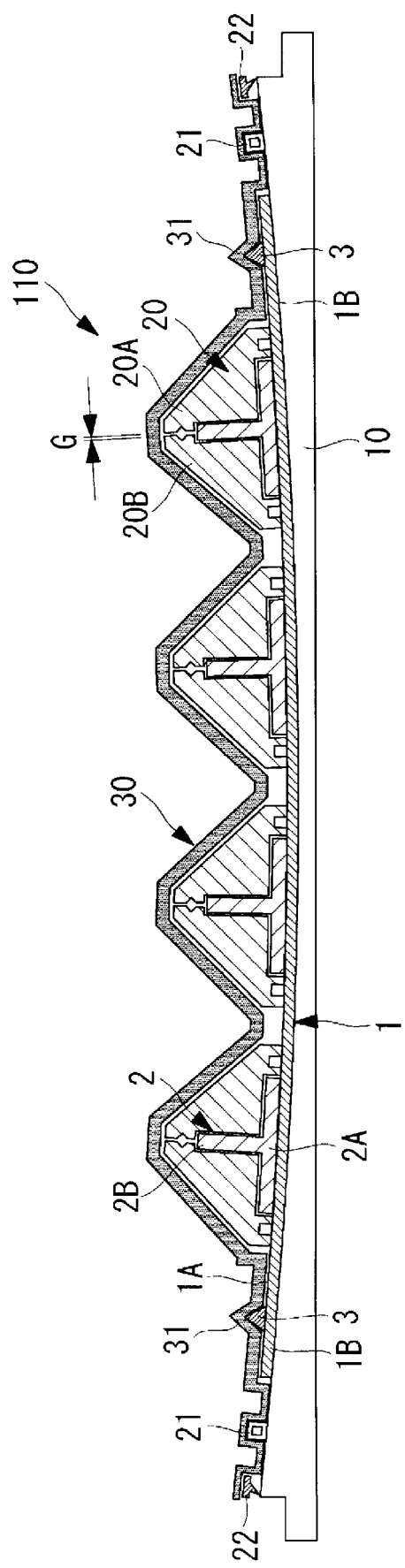
FIG. 2 is a vertical cross-sectional view of the device for manufacturing a fiber-reinforced plastic article according to the first embodiment of the present invention.

The skin 1 also includes an excess portion 1B (see FIG. 2) that is removed in the final stages. Positioning portions 3 are formed on the excess portion 1B. As illustrated in FIG. 2, the positioning portions 3 are shaped like a protrusion, for example. The positioning portions 3 may be formed integrally with the skin 1, or may be a separate protrusion-like member that is inserted into holes formed in the skin 1.

The stringer 2 is an elongated member that extends in the longitudinal direction D, with greater dimensions in the longitudinal direction D than in the cross-sectional direction orthogonal to the longitudinal direction D. The stringer 2 has a T-shaped cross section; however, a different shape may be used.

The stringer 2 includes a flange 2A that attaches to the skin 1 and a web 2B that extends from the center in the width direction of the flange 2A. A plurality of the stringers 2 are disposed on the back surface 1A of the skin 1 at intervals in a direction intersecting the longitudinal direction D.

The stringers 2 disposed on the back surface 1A of the skin reinforce the skin 1.

The skin 1 and the stringers 2 are both formed from fiber-reinforced plastic (FRP) made from a fabric and resin.

The fabric is made from a plurality of sheet-like members. The number of sheet-like members layered together depends on the required thickness of the skin 1 or stringer 2. Examples of the fiber that may be discretionarily used in the fabric include carbon fiber and glass fiber.

The resin impregnated in the fabric may be a thermosetting resin, which is cured by heating, such as epoxy resin, polyimide, urethane, and unsaturated polyester. Also, a thermoplastic resin, which is solidified after heating, such as polyamide, ABS resin, polyetheretherketone (PEEK), and polyphenylene sulfide (PPS) can be used.

The FRP used in the skin and the FRP used in the stringer 2 may have the same or different type of fiber, type of resin, or fabric configuration.

In the present embodiment, vacuum assisted resin transfer molding (VaRTM) is employed to mold the fiber-reinforced plastic. In other words, by drawing a vacuum to reduce the pressure to a vacuum pressure, the injection of the resin is facilitated, and the resin fabric and the resin are compressed via the difference in pressure between the pressure of the depressurized space and the atmospheric pressure. Note that the present invention can also be applied to methods other than VaRTM, for example, the methods including co-bond molding, such as prepreg molding, in which two members are integrally molded.

Next, the manufacturing device 110 that composes the device for manufacturing the fiber-reinforced plastic article 200 will be described.

As illustrated in FIGS. 1 and 2, the device 110 for manufacturing is provided with a skin mold 10 for molding the skin 1, and a stringer mold 20 for molding the stringer 2. In the present embodiment, the resin fabric that will be a part of the stringer 2 and is unimpregnated by resin is adhered to and concurrently integrally formed to the cure-molded skin 1, i.e. co-bond molding.

The skin mold 10 is formed from a discretionary generic material such as steel. The skin mold 10 is provided with a mold portion with a curved surface for molding the skin 1 and a periphery portion which is the portion around the mold portion.

The stringer mold 20 holds the fabric, i.e. the fiber-reinforced plastic material (raw material), which becomes the stringer 2 after molding against the back surface 1A of the skin 1. For the stringer mold 20, molds which correspond in dimension and shape with the stringers 2 are prepared.

The stringer molds 20 are formed from a metal such as aluminum alloy, for example.

As illustrated in FIG. 2, the stringer molds 20 each include an inner surface that conforms to the shape of the stringer 2 formed in an upside down T shape on the skin 1, and have a substantially triangular cross section.

The stringer molds 20 are each divided in the longitudinal direction D into a block 20A positioned on one side of the web 2B (see FIG. 1) of the stringer 2 and block 20B positioned on the other side. A molding space for molding the FRP is formed on the inner side of the blocks 20A, 20B.

As illustrated in FIG. 2, the folded plate 30 is formed with a plurality of recessed portions for accommodating the plurality of stringer molds 20, and has a wave-like cross section like a corrugated plate. Sealing portions 21, 22 are disposed between the skin mold 10 and the folded plate 30, i.e. on the periphery portion of the folded plate 30, to make a sealed space inside the folded plate 30 when the inside is vacuumed and the resin is injected. Recessed portions that correspond to the sealing portions 21, 22 are formed on the folded plate 30. The folded plate 30 has flexibility and can transmit a pressing force caused by a difference in pressure between outside and inside from the outside to the blocks 20A, 20B. Thus, upon drawing a vacuum, the fabric is compressed inside the blocks 20A, 20B by the pressing force from the outside caused by the vacuum. This compression reduces the volume of the fabric. Accordingly, by drawing a vacuum with the fabric disposed between the block 20A and the block 20B, the block 20A and the block 20B are pressed due to the difference in pressure between the atmospheric pressure. Following the reduction in volume of the fabric, a gap G closes and a molding space S is formed. The molding space S is injected with a liquid resin from outside via a non-illustrated injection path.

Note that in the VaRTM described above, a vacuum is drawn only from the vacuum port side. Additionally, to remove excess resin after the resin injection, a bleeding process may be performed by drawing a vacuum from both the injection hole side and the vacuum port side. In such a case, the block 20A and the block 20B come together to close the gap G in the bleeding process.

Positioning portions 31 are formed in the folded plate 30. For example, the positioning portions 31 are disposed in a direction intersecting the longitudinal direction of the stringers 2 on either side of the stringer molds 20. As illustrated in FIG. 2, in an embodiment in which the positioning portion 31 of the folded plate 30 is a recessed portion, the positioning portion 3 of the skin 1 is a protruding portion with a shape corresponding to that of the positioning portion 31. On the other hand, in an embodiment in which the positioning portion 31 of the folded plate 30 is a protruding portion projecting to the skin 1 side, the positioning portion 3 of the skin 1 may be a recessed portion.

Thus, the folded plate 30 is positioned relative to the skin 1, and the stringer 2 can be prevented from moving in the direction orthogonal to the longitudinal direction by the folded plate 30.

Next, a method of manufacturing the fiber-reinforced plastic molded article 200 will be described with reference to FIGS. 1 and 2.

First, the skin 1 is formed. The method of molding the skin 1 is discretionary; however, a method employing VaRTM method will be briefly described.

A fabric, i.e. the FRP material for the skin 1 is disposed in the skin mold 10 and held down by a non-illustrated plate-like molding jig. The fabric and the molding jig are sealed in a sealed space formed between a non-illustrated bag film and the skin mold 10. Then, a vacuum is drawn to reduce the pressure in the sealed space, and the fabric is compressed. Next, with the sealed space still in a state of vacuum pressure, resin is injected. After the resin injection, the resin is cured while a vacuum is continuously drawn or with the vacuum line closed and the vacuum drawing stopped.

Note that after vacuum drawing is stopped, a discretionary heat source may be used to heat the resin. Examples of the heat source include an oven, a heater mat, a far infrared heater, and a thermal fluid heating system.

The resin is cured to a predetermined hardness, and the fabric and the resin are integrally joined to form the skin 1. Note that the positioning portions 3 are formed in the excess portion 1B of the formed skin 1.

The formed skin 1 is temporarily removed from the mold for ultrasonic testing, for example. Then, the skin 1 is returned to the skin mold 10, where the stringer 2 is joined to the back surface 1A of the skin 1, and the two are integrally formed.

As illustrated in FIG. 1, the folded plate 30 is positioned relative to the skin 1 using the positioning portions 3 and the positioning portions 31.

First, the stringer molds 20 accommodating fabrics are lined up on the back surface 1A of the skin 1. Here, the fabrics are sandwiched between the blocks 20A, 20B of the stringer molds 20 and the gap G is formed between the blocks 20A, 20B. Note that a film-shaped adhesive may be disposed between the fabrics and the skin 1.

One folded plate 30 is placed over the upper surface of the stringer molds 20. Here, the positioning portions 3 of the skin 1 are inserted in the positioning portions 31 of the folded plate 30. Thus, the stringer molds 20 are positioned relative to the skin 1 via the folded plate 30. Here, the fabrics are accommodated inside the stringer molds 20, and by the stringer molds 20 being positioned relative to the skin 1, the fabrics are disposed at determined positions on the back surface 1A of the skin 1. Then, as described below, vacuum drawing, resin injecting, and heating are performed in a manner similar to the method for molding the skin 1 to form the stringers 2.

The skin 1 and the stringer molds 20 are covered with the folded plate 30, and the pressure of the sealed space formed between the folded plate 30 and the skin mold 10 is reduced by drawing a vacuum. The folded plate 30 has flexibility and can transmit a pressing force caused by a difference in pressure between outside and inside from the outside to the blocks 20A, 20B. Thus, upon drawing a vacuum, the fabric is compressed inside the blocks 20A, 20B by the pressing force from the outside caused by the vacuum. This compression reduces the volume of the fabric. Accordingly, by drawing a vacuum with the fabric disposed between the block 20A and the block 20B, the block 20A and the block 20B are pressed due to the difference in pressure between the atmospheric pressure. Following the reduction in volume of the fabric, a gap G closes and a molding space S is formed. While the vacuum pressure is maintained, the molding space S is injected with a liquid resin from outside via a non-illustrated injection path.

Then, the resin impregnated in the fabrics are heated. The heat from the heat source to heat the resin also transfers to the stringer molds 20 and the skin mold 10.

However, by the stringer molds 20 being positioned relative to the skin 1 via the folded plate 30, thermal expansion of the skin mold 10 has no effect on the stringer molds 20, and the fabrics can be disposed in the correct position relative to the skin 1.

When the resin impregnated in the fabrics is cured to a predetermined hardness via heating, the stringers 2 adhere to the skin 1 and are integrally formed. Thereafter, a secondary curing process and a finishing process are performed as necessary, thus completing the fiber-reinforced plastic molded article 200 of an integrally formed skin 1 and stringers 2.

In the present embodiment, the folded plate 30 is fixed to the skin 1 and not fixed to the skin mold 10. This allows the skin mold 10 to escape the effects of thermal expansion, which allows highly accurate positioning to be achieved.

Additionally, the folded plate 30 also functions as a bag film, thus removing the need to prepare a separate bag film. Furthermore, by the positioning portions 31 being formed on the folded plate 30, positioning and preparing of the bag film are performed simultaneously, reducing the workload of the manufacturing process.

The positioning portions 3 are formed on the excess portion 1B, which is a non-required portion of the fiber-reinforced plastic molded article 200. Accordingly, after molding, when the finished product of the fiber-reinforced plastic molded article 200 is manufactured, the excess portion 1B on which the positioning portions 3 are formed may be removed. This allows a final product without the protruding portions or holes of the positioning portions 3 to be manufactured.

Second Embodiment

Figure 3:
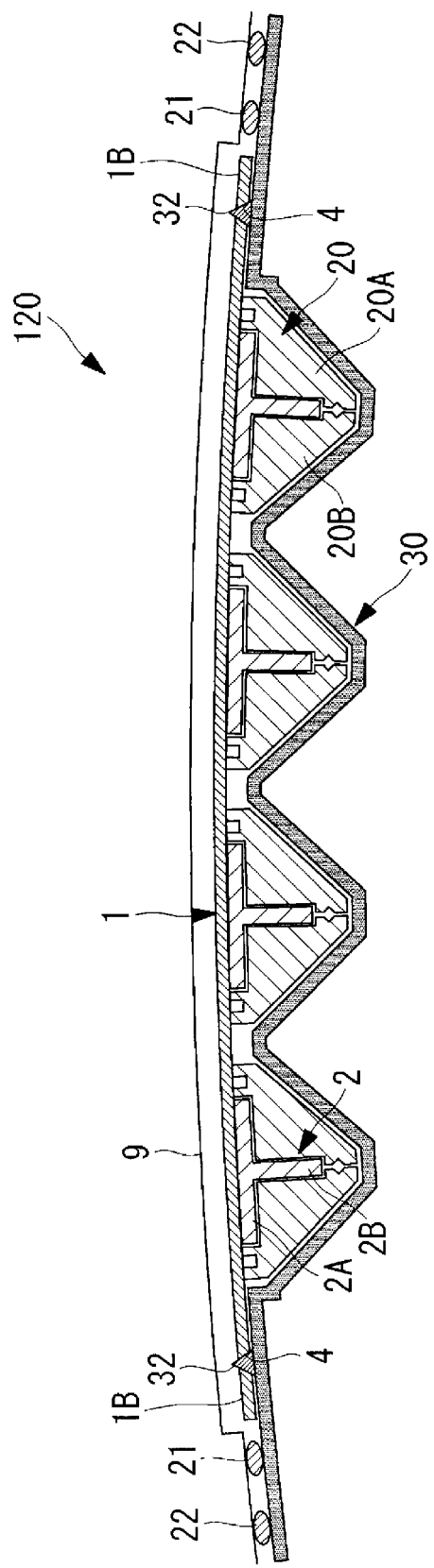
FIG. 3 is a vertical cross-sectional view of a device for manufacturing a fiber-reinforced plastic article according to the second embodiment of the present invention.

Next, a device 120 for manufacturing a fiber-reinforced plastic molded article and a method for manufacturing the same according to the second embodiment of the present invention will be described with reference to FIG. 3.

In the first embodiment described above, the skin 1 is mounted in the skin mold 10. On the skin 1, the stringer molds 20 accommodating the fabrics are mounted, on which the folded plate 30 is mounted. However, the present invention is not limited to this example.

With each component turned upside down, the stringer molds 20 may be mounted in the folded plate 30, and the skin 1 may be mounted on the stringer molds 20. Here, the folded plate 30 is supported by a non-illustrated support member.

When the skin 1 is disposed on the folded plate 30, positioning portions 32 of the folded plate 30 are inserted in positioning portions 4 of the skin 1. In the example illustrated in FIG. 3, the positioning portions 4 are holes formed in the skin 1. The positioning portions 32 of the folded plate 30 are protrusion portions projecting to the skin 1 side.

Thus, the stringer molds 20 are positioned relative to the skin 1 via the folded plate 30. Here, the fabrics are accommodated inside the stringer molds 20, and by the stringer molds 20 being positioned relative to the skin 1, the fabrics are disposed at determined positions on the back surface 1A of the skin 1.

The skin 1 is sealed in a sealed space formed between a bag film 9 and the folded plate 30. Next, a vacuum is drawn to reduce the pressure in the sealed space. The folded plate 30 has flexibility and can transmit a pressing force caused by a difference in pressure between outside and inside from the outside to the blocks 20A, 20B. Thus, upon drawing a vacuum, the fabric is compressed inside the blocks 20A, 20B by the pressing force from the outside caused by the vacuum. This compression reduces the volume of the fabric. Accordingly, by drawing a vacuum with the fabric disposed between the block 20A and the block 20B, the block 20A and the block 20B are pressed due to the difference in pressure between the atmospheric pressure. Following the reduction in volume of the fabric, a gap G closes and a molding space S is formed. While the vacuum pressure is maintained, the molding space S is injected with liquid resin from outside via a non-illustrated injection path.

Then, the resin impregnated in the fabrics are heated. By the stringer molds 20 being positioned relative to the skin 1 via the folded plate 30, the fabrics can be disposed in the correct position relative to the skin 1.

When the resin impregnated in the fabrics is cured to a predetermined hardness via heating, the stringers 2 adhere to the skin 1 and are integrally formed.

The present embodiment is different from the first embodiment described above in that a member corresponding to the skin mold 10 is not required. Additionally, the skin 1 itself functions as a mold, and the stringer molds 20 are positioned relative to the skin 1 via the folded plate 30. Accordingly, positioning errors due to the difference in thermal expansion are avoided, and the fabrics can be disposed in the correct position relative to the skin 1.

The positioning portions 4 are formed on the excess portion 1B, which is a non-required portion of the fiber-reinforced plastic molded article 200. Accordingly, after molding, when the finished product of the fiber-reinforced plastic molded article 200 is manufactured, the excess portion 1B on which the positioning portions 4 are formed may be removed. This allows a final product without the protruding portions or holes of the positioning portions 4 to be manufactured.

Third Embodiment

Figure 4:
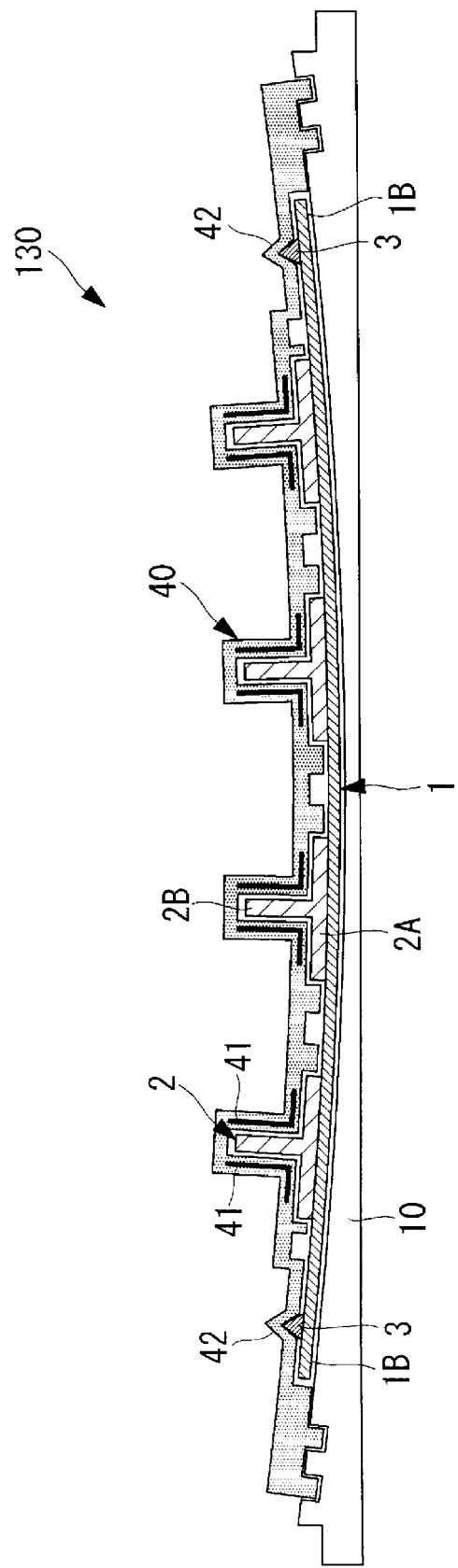
FIG. 4 is a vertical cross-sectional view of a device for manufacturing a fiber-reinforced plastic article according to the third embodiment of the present invention.

Next, a device 130 for manufacturing a fiber-reinforced plastic molded article and a method for manufacturing the same according to the third embodiment of the present invention will be described with reference to FIG. 4.

In the first embodiment described above, the folded plate 30 and the stringer molds 20 are assembled together before the fabrics are impregnated with resin. However, the present invention is not limited to this example. As illustrated in FIG. 4, a bladder 40 may be used instead of the folded plate 30 and the stringer molds 20.

The bladder 40 holds the fabrics against the back surface 1A of the skin 1. For the bladder 40, a bladder 40 which corresponds in dimension and shape with the stringers 2 is prepared. The bladder 40 is made of flexible resin such as a silicon resin, synthetic rubber, or fluororubber, for example. The folded regions are reinforced in parts by reinforcing portions 41 made of a glass fiber, for example.

The bladder 40 includes an inner surface that conforms to the shape of the stringers 2 formed in an upside down T shape on the skin 1, and have substantially constant thickness at the position where it corresponds to the stringer 2.

When the stringer 2 are molded, the fabrics are compressed inside the bladder 40 via the vacuum. This compression reduces the volume of the fabric. Accordingly, by drawing a vacuum with the fabric interposed in the bladder 40, the bladder 40 is pressed due to the difference in pressure between the atmospheric pressure. Following the reduction in volume of the fabric, the internal space of the bladder 40 narrows and a molding space S is formed. The molding space S is injected with liquid resin from outside via a non-illustrated injection path.

In the present embodiment, first, the back surface 1A of the skin 1 is covered with one bladder 40. Here, the positioning portions 3 of the skin 1 are inserted in positioning portions 42 of the bladder 40. In the example illustrated in FIG. 4, the positioning portions 3 are shaped like protrusions formed in the skin 1. The positioning portions 42 of the bladder 40 are recessed portions with a shape corresponding to that of the positioning portions 3.

In such a manner, the bladder 40 is positioned relative to the skin 1. Here, the fabrics are accommodated inside the bladder 40, and by the bladder 40 being positioned relative to the skin 1, the fabrics are disposed at determined positions on the back surface 1A of the skin 1.

Then, as described below, vacuum drawing and heating are performed in a manner similar to the method for molding the skin 1 to form the stringers 2. Here, the fabrics are interposed in the bladder 40. A film-shaped adhesive is disposed between the fabrics and the skin 1.

The skin 1 and the fabrics are covered by the bladder 40, and the pressure of the sealed space formed between the bladder 40 and the skin mold 10 is reduced. As a result, the difference in pressure between the sealed space and the atmosphere acts upon the bladder 40 and the fabrics and the resin on the inner side of the bladder 40 to compress the fabrics and the resin impregnated in the fabrics. Following from this, the sealed space inside the bladder 40 decreases in size.

Then, the resin impregnated in the fabrics are heated. The heat from the heat source to heat the resin also transfers to the skin mold 10. However, by the bladder 40 being positioned relative to the skin 1, thermal expansion of the skin mold 10 has no effect on the bladder 40, and the fabrics can be disposed in the correct position relative to the skin 1.

The positioning portions 3 are formed on the excess portion 1B, which is a non-required portion of the fiber-reinforced plastic molded article 200. Accordingly, after molding, when the finished product of the fiber-reinforced plastic molded article 200 is manufactured, the excess portion 1B on which the positioning portions 3 are formed may be removed. This allows a final product without the protruding portions or holes of the positioning portions 3 to be manufactured.

Fourth Embodiment

Next, a device 140 for manufacturing a fiber-reinforced plastic molded article and a method for manufacturing the same according to the fourth embodiment of the present invention will be described with reference to FIGS. 5 to 7.

In the first embodiment described above, the folded plate 30 is positioned relative to the skin 1. However, in the present embodiment, the stringer molds 20 may be positioned relative to the skin 1 without using the folded plate 30. In the present embodiment, positioning portions 23 are formed on the stringer molds 20.

Figure 7:
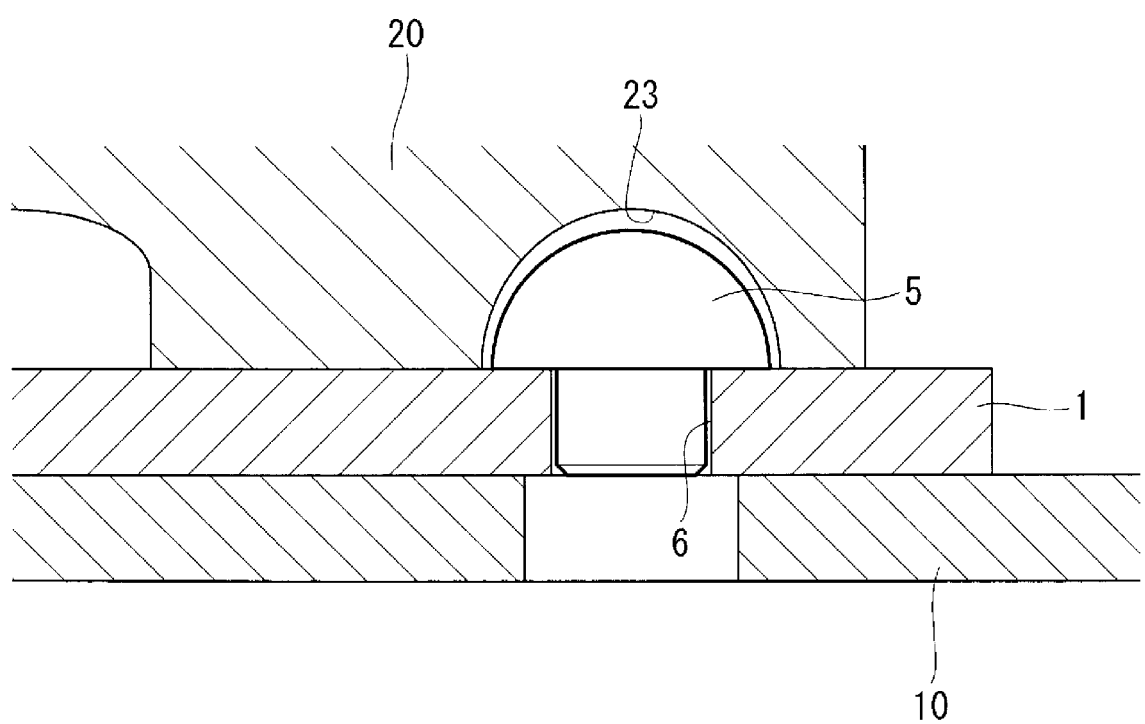
FIG. 7 is a partially enlarged vertical cross-sectional view illustrating a portion representing portion A of FIG. 6.

As illustrated in FIG. 7, the positioning portions 23 are shaped like a recess, for example. On the skin 1, positioning portions 5 with a shape corresponding to that of the positioning portions 23 are formed. The positioning portions 5 may be formed integrally with the skin 1, or as illustrated in FIG. 7, may be a separate protrusion-like member that is inserted into holes 6 formed in the skin 1.

First, the stringer molds 20 are lined up on the back surface 1A of the skin 1. Here, the positioning portions 5 of the skin 1 are inserted in positioning portions 23 of the stringer molds 20. Thus, the stringer molds 20 are positioned relative to the skin 1. Here, the fabrics are accommodated inside the stringer molds 20, and by the stringer molds 20 being positioned relative to the skin 1, the fabrics are disposed at determined positions on the back surface 1A of the skin 1.

Figure 5:
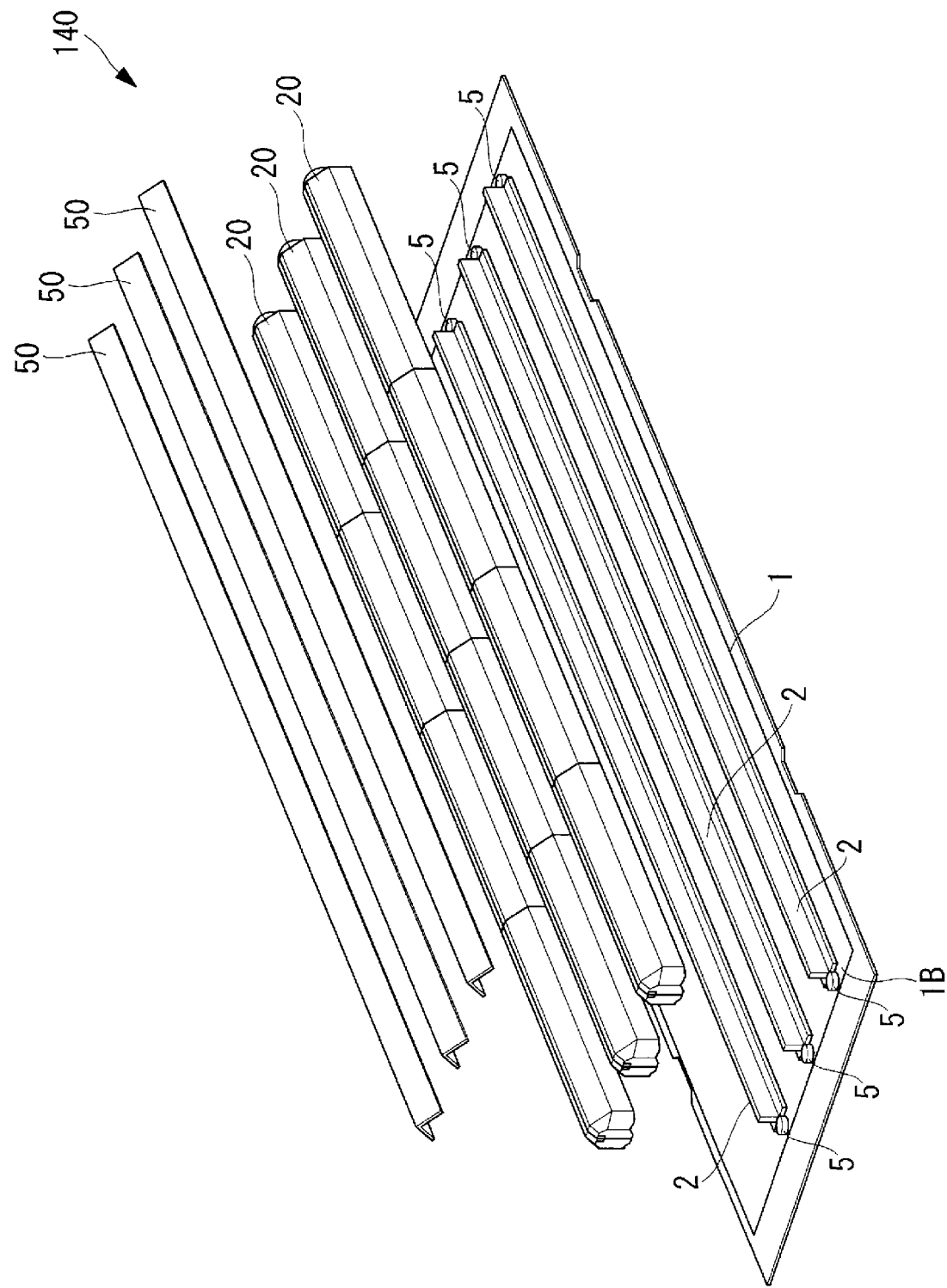
FIG. 5 is an exploded perspective view of a device for manufacturing a fiber-reinforced plastic article according to the fourth embodiment of the present invention.
Figure 6:
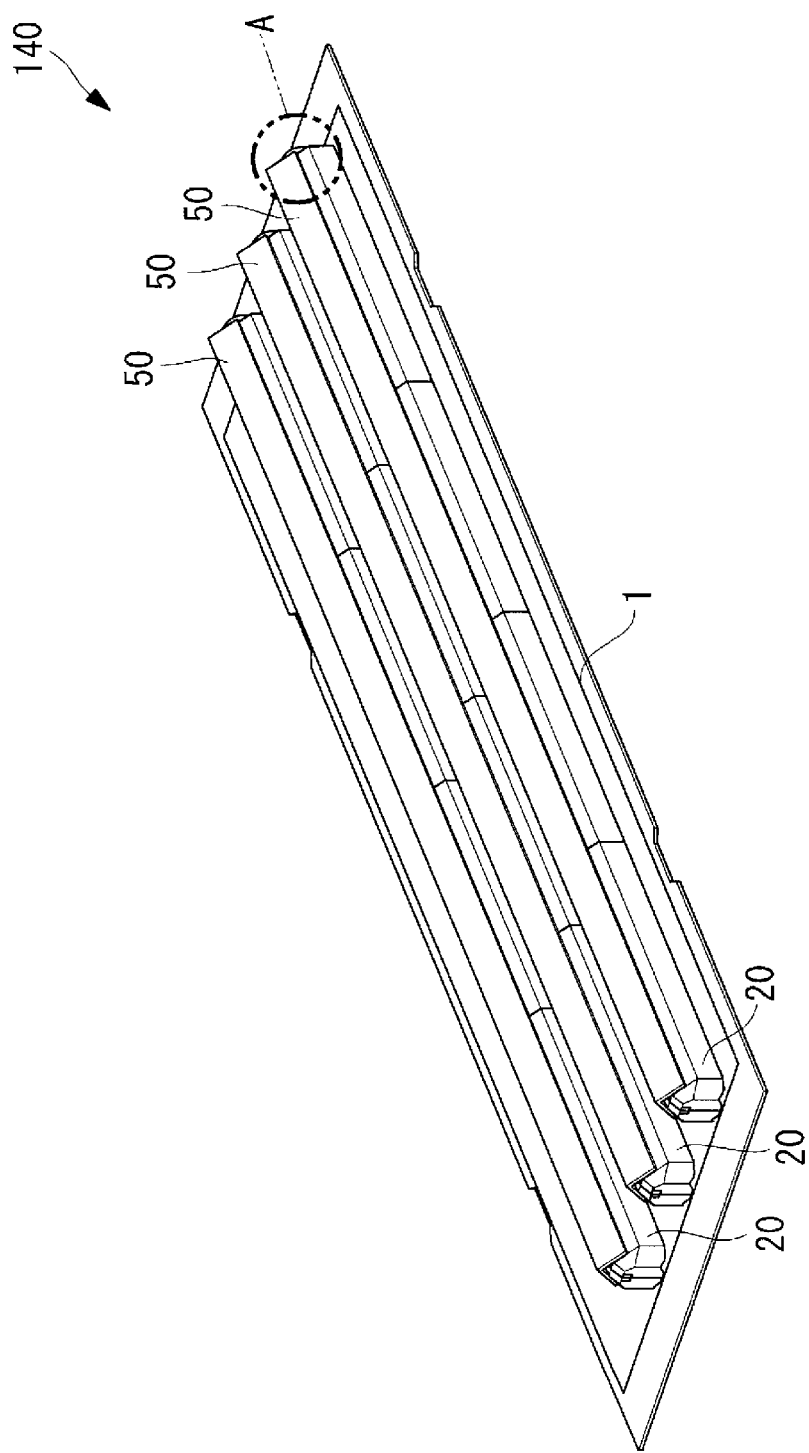
FIG. 6 is a perspective view of the device for manufacturing a fiber-reinforced plastic article according to the fourth embodiment of the present invention.

Additionally, as illustrated in FIGS. 5 and 6, angle members 50 are disposed on the inclined surface of the blocks 20A, 20B (see FIG. 2) of the stringer molds 20. These allow the blocks 20A, 20B to be aligned with respect to the center of the stringer mold 20. To ensure the blocks 20A, 20B are correctly aligned, the angle member 50 and the blocks 20A, 20B are preferably joined together at both ends in the length direction.

Then, as described below, vacuum drawing and heating are performed in a manner similar to the method for molding the skin 1 to form the stringers 2. In other words, the fabric is disposed between the blocks 20A, 20B (see FIG. 2) of the stringer mold 20 in a similar manner to that of the first embodiment. The gap G is formed between the blocks 20A, 20B. A film-shaped adhesive is disposed between the fabrics and the skin 1.

The skin 1 and the stringer molds 20 are covered with a bag film, and the pressure of the sealed space formed between the bag film and the skin mold 10 is reduced by drawing a vacuum. The folded plate 30 has flexibility and can transmit a pressing force caused by a difference in pressure between outside and inside from the outside to the blocks 20A, 20B. Thus, upon drawing a vacuum, the fabric is compressed inside the blocks 20A, 20B by the pressing force from the outside caused by the vacuum. This compression reduces the volume of the fabric. Accordingly, by drawing a vacuum with the fabric disposed between the block 20A and the block 20B, the block 20A and the block 20B are pressed due to the difference in pressure between the atmospheric pressure. Following the reduction in volume of the fabric, a gap G closes and a molding space S is formed. While the vacuum pressure is maintained, the molding space S is injected with a liquid resin from outside via a non-illustrated injection path.

Then, the resin impregnated in the fabrics is heated. The heat from the heat source to heat the resin also transfers to the stringer molds 20 and the skin mold 10. However, by the stringer molds 20 being positioned relative to the skin 1 without using the skin mold 10, thermal expansion of the skin mold 10 has no effect on the stringer molds 20, and the fabrics can be disposed in the correct position relative to the skin 1.

The positioning portions 5 are formed on the excess portion 1B, which is a non-required portion of the fiber-reinforced plastic molded article 200. After molding, when the finished product of the fiber-reinforced plastic molded article 200 is manufactured, the excess portion 1B on which the positioning portions 5 are formed may be removed. This allows a final product without the protruding portions or holes of the positioning portions 5 to be manufactured.

Note that a plate made of invar (low thermal expansion member) is preferably positioned by the positioning portions 5 formed on the skin 1, and the stringer molds 20 are preferably positioned on the skin 1 with the plate therebetween via protrusion-like (semi-circular, for example) positioning portions on the plate. In other words, a plate made of invar (low thermal expansion member) on which protrusion-like positioning portions for positioning are provided is disposed between the positioning portion 5 and the stringer molds 20 as illustrated in FIG. 5. Such an embodiment can suppress costs because, the invar member (low thermal expansion member), which is used in this embodiment, is a manufactured plate article. Additionally, if the configuration of the stringer molds 20 does not allow protrusion-like positioning portions to be formed on the excess portion 1B of the skin 1, positioning can be performed using the invar plate (low thermal expansion member) described above.

Furthermore, in the embodiments described above, positions opened as a fastener open in a later process can be used as the positioning portions. Additionally, by being able to provide the positioning portions 3, 4, 5 in a final product, if the configuration of the stringer molds 20 does not allow the protrusion-like positioning portions 3, 4, 5 to be formed on the excess portion 1B of the skin 1, positioning can be performed.

REFERENCE SIGNS LIST

1 Skin
2 Stringer
10 Skin mold
20 Stringer mold
30 Folded plate
40 Bladder

The invention claimed is:

1. A device for manufacturing a fiber-reinforced plastic molded article, the device comprising:
 a first mold in which a cured fiber-reinforced composite member is mounted;
 a second mold that accommodates a fabric to be joined to the fiber-reinforced composite member; and
 a folded plate comprising a plurality of recessed grooves and a plurality of first protruding portions or first recessed portions and having a wave-shaped cross section, the plurality of recessed grooves accommodating so as to cover an outer surface of the second mold, and the plurality of first protruding portions or first recessed portions being disposed only along a longitudinal direction of the recessed grooves so as to sandwich outermost recessed grooves of the plurality of recessed grooves from outside in a direction intersecting the longitudinal direction of the outermost recessed grooves,
 wherein a plurality of the second recessed portions or second protruding portions are disposed on a surface of the fiber-reinforced composite member along a longitudinal direction of the fiber-reinforced composite member, and the folded plate is positioned relative to the fiber-reinforced composite member by the first protruding portions of the folded plate inserted into the second recessed portions disposed on the fiber-reinforced composite member in a case the first protruding portions are disposed on the folded plate, or, by the second protruding portions disposed on the fiber-reinforced composite member inserted into the first recessed portions of the folded plate in a case the first recessed portions are disposed on the folded plate.

2. The device for manufacturing a fiber-reinforced plastic molded article according to claim 1 that are used to manufacture the fiber-reinforced plastic molded article by joining the fabric to the fiber-reinforced composite member and forming into the fiber-reinforced plastic molded article.

3. The device for manufacturing a fiber-reinforced plastic molded article according to claim 1,
wherein sealing portions are disposed between the first mold and the folded plate on a periphery portion of the folded plate, and
recessions that correspond to the sealing portions are disposed on the folded plate.

4. The device for manufacturing a fiber-reinforced plastic molded article according to claim 1,
wherein the folded plate includes the plurality of recessed grooves and the plurality of first protruding portions or first recessed portions on one side thereof, and a plurality of another recessed grooves and a plurality of another first protruding portions or first recessed portions on another side thereof.

5. A device for manufacturing a fiber-reinforced plastic molded article, the device comprising:
a mold that accommodates a fabric to be joined to a cured fiber-reinforced composite member; and
a folded plate comprising a plurality of recessed grooves and a plurality of protruding portions and having a wave-shaped cross section, the plurality of recessed grooves accommodating so as to cover an outer surface of the mold, and the plurality of protruding portions being disposed only along a longitudinal direction of the recessed grooves so as to sandwich outermost recessed grooves of the plurality of recessed grooves from outside in a direction intersecting the longitudinal direction of the outermost recessed grooves,
wherein a plurality of holes are disposed on a surface of the fiber-reinforced composite member along a longitudinal direction of the fiber-reinforced composite member, and
the folded plate is positioned relative to the fiber-reinforced composite member by the protruding portions of the folded plate inserted into the holes disposed on the fiber-reinforced composite member.

6. The device for manufacturing a fiber-reinforced plastic molded article according to claim 5 that are used to manufacture the fiber-reinforced plastic molded article by joining the fabric to the fiber-reinforced composite member and forming into the fiber-reinforced plastic molded article.

7. A device for manufacturing a fiber-reinforced plastic molded article, the device comprising:
a first mold in which a cured fiber-reinforced composite member is mounted; and
a bladder made of flexible resin comprising a recessed groove that accommodates a fabric to be joined to the fiber-reinforced composite member and a plurality of first protruding portions or first recessed portions being disposed only along a longitudinal direction of the recessed grooves so as to sandwich outermost recessed grooves of the plurality of recessed grooves from outside in a direction intersecting the longitudinal direction of the outermost recessed grooves,
wherein the bladder includes an inner surface having dimension and shape corresponding to the fabric to be joined to the fiber-reinforced composite member, and is reinforced by reinforcing members made of a glass fiber at an area where the fabric is joined to the fiber-reinforced composite member, the reinforcing members being embedded in the bladder and having a shape corresponding to a shape of a joining portion of the fiber-reinforced composite member and the fabric,
a plurality of second recessed portions or second protruding portions are disposed on a surface of the fiber-reinforced composite member along a longitudinal direction of the fiber-reinforced composite member, and
the bladder is positioned relative to the fiber-reinforced composite member by the first protruding portions of the bladder inserted into the second recessed portions disposed on the fiber-reinforced composite member in a case the plurality of first protruding portions are disposed on the bladder, or, by the second protruding portions disposed on the fiber-reinforced composite member inserted into the first recessed portions of the bladder in a case the first recessed portions are disposed on the bladder.

8. The device for manufacturing a fiber-reinforced plastic molded article according to claim 7 that are used to manufacture the fiber-reinforced plastic molded article by joining the fabric to the fiber-reinforced composite member and forming into the fiber-reinforced plastic molded article.

9. The device for manufacturing a fiber-reinforced plastic molded article according to claim 7,
wherein sealing portions are disposed between the first mold and the bladder on a periphery portion of the bladder, and
recessions that correspond to the sealing portions are disposed on the first mold.

* * * * *